United States Patent
Lee

(10) Patent No.: US 6,703,731 B2
(45) Date of Patent: Mar. 9, 2004

(54) ELECTRIC MOTOR

(75) Inventor: Ka-lun Lee, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 36 days.

(21) Appl. No.: 09/931,041

(22) Filed: Aug. 17, 2001

(65) Prior Publication Data

US 2002/0047349 A1 Apr. 25, 2002

(30) Foreign Application Priority Data

Aug. 19, 2000 (GB) ............................................. 0020418
Sep. 21, 2000 (GB) ............................................. 0023268

(51) Int. Cl.[7] ................................................. H02K 7/00
(52) U.S. Cl. ................................. 310/68 B; 310/154.02
(58) Field of Search ............ 310/68 B, 154.01–154.49, 310/71, 181, 152, 156.05, 156.06

(56) References Cited

U.S. PATENT DOCUMENTS

| | | | | |
|---|---|---|---|---|
| 2,754,464 A | * | 7/1956 | Wizenez et al. ............ | 310/68 B |
| 3,466,477 A | * | 9/1969 | Newill ........................ | 310/125 |
| 3,967,200 A | | 6/1976 | Tetsugu et al. .............. | 326/173 |
| 4,039,936 A | * | 8/1977 | Jones et al. ................ | 310/49 A |
| 4,082,968 A | | 4/1978 | Jones ......................... | 370/68 B |
| 4,136,312 A | | 1/1979 | Salon et al. .................. | 324/51 |
| 4,138,642 A | * | 2/1979 | Mohr .......................... | 324/173 |
| 4,302,692 A | | 11/1981 | Matsumoto et al. ........ | 310/113 |
| 4,700,133 A | * | 10/1987 | Day ............................. | 310/168 |
| 4,914,713 A | | 4/1990 | Mueller et al. ............. | 388/805 |
| 5,294,851 A | * | 3/1994 | Tajima et al. .......... | 310/40 MM |
| 5,349,257 A | | 9/1994 | Hernden ................... | 310/68 B |
| 5,477,143 A | * | 12/1995 | Wu ........................ | 324/207.21 |
| 5,631,508 A | * | 5/1997 | Cho et al. ............... | 310/156.34 |
| 5,675,464 A | | 10/1997 | Makaran et al. .............. | 361/23 |
| 5,925,950 A | * | 7/1999 | Lau ........................... | 310/68 B |

FOREIGN PATENT DOCUMENTS

GB 1563605 10/1976
JP 10032962 3/1998

* cited by examiner

*Primary Examiner*—Dang Le
(74) *Attorney, Agent, or Firm*—Birch, Stewart, Kolasch & Birch, LLP

(57) ABSTRACT

A permanent magnet direct current motor 10 has a permanent magnet stator with at least one permanent magnet 14. The magnet 14 faces poles of an armature core 26 across a small air gap. A speed sensor 12 is located in the air gap for detecting rotation of the armature core. The speed sensor 12 is a single turn coil fixed to a surface of the magnet 14 facing the armature core. Terminals 38 of the coil are located on an axial end surface of the magnet and mate with resiliently deformable fingers or spring biased terminals 36 fixed to the motor end cap 20.

14 Claims, 2 Drawing Sheets

ELECTRIC MOTOR

This invention relates to electric motors and in particular, to an electric motor incorporating a speed sensor.

The emphasis on designing electric motors, especially miniature permanent magnet electric motors, has been and continues to be to reduce the size or volume of the motor without loss of power output. However, in the past, as components are added to a motor to improve an aspect of the motor, the size of the motor was increased to accommodate the new components. This is particularly evident for speed sensors which are required for servo systems. Speed sensors generally provide a voltage or pulse output whose amplitude or frequency is a function of the speed of the motor. This signal is used by a servo amplifier to control the motion of the motor.

Typical techniques to measure the speed of a motor include adding tacho-generators or frequency generators to the shaft of the motor. These require additions to the motor frame size and thereby increases its bulk. Techniques involving detecting the current peaks in the motor's electrical input have been tried and while moderately successful, involve sensitive electronics which are affected by noisy environments and unclean commutator switching which often occurs with motor wear rendering the sensor inoperative in a worst case scenario.

Accordingly, there is a need for a speed sensor which is less dependent on the input power and which does not increase the bulk or size of the motor.

This is achieved by the present invention by a sensor coil being formed on an inner face of a stator magnet and located in the air gap between the magnet and the rotor.

Thus, the present invention, in one aspect thereof, provides a permanent magnet direct current motor comprising: a permanent magnet stator including at least one permanent magnet; a rotor including a rotor shaft, an armature core mounted on the shaft and having a plurality of poles, an armature winding wound about the poles, and a commutator mounted on the shaft adjacent one end of the armature core and connected to lead wires of the armature winding, the rotor being journaled in bearings and located confronting the stator; and a speed sensor; wherein the speed sensor is a coil of conductive material fixed to a surface of the magnet and located in the air gap between the permanent magnet and the armature core.

Preferably, the coil is a single turn coil fixed to an inner face of the magnet facing the armature core.

Preferably, the coil is a single turn coil in the form of a long narrow "U".

Preferably, the terminals of the coil are located on an axial end face of the magnet.

Preferably, the terminals of the coil mate with resiliently deformable fingers or spring biased terminals fixed to the motor end cap. The deformable fingers may be metallic strips or conductive rubber terminals fixed to the end cap.

Preferred embodiments of the invention will now be described, by way of example only, with reference to the accompanying drawings in which.

Figure 1:
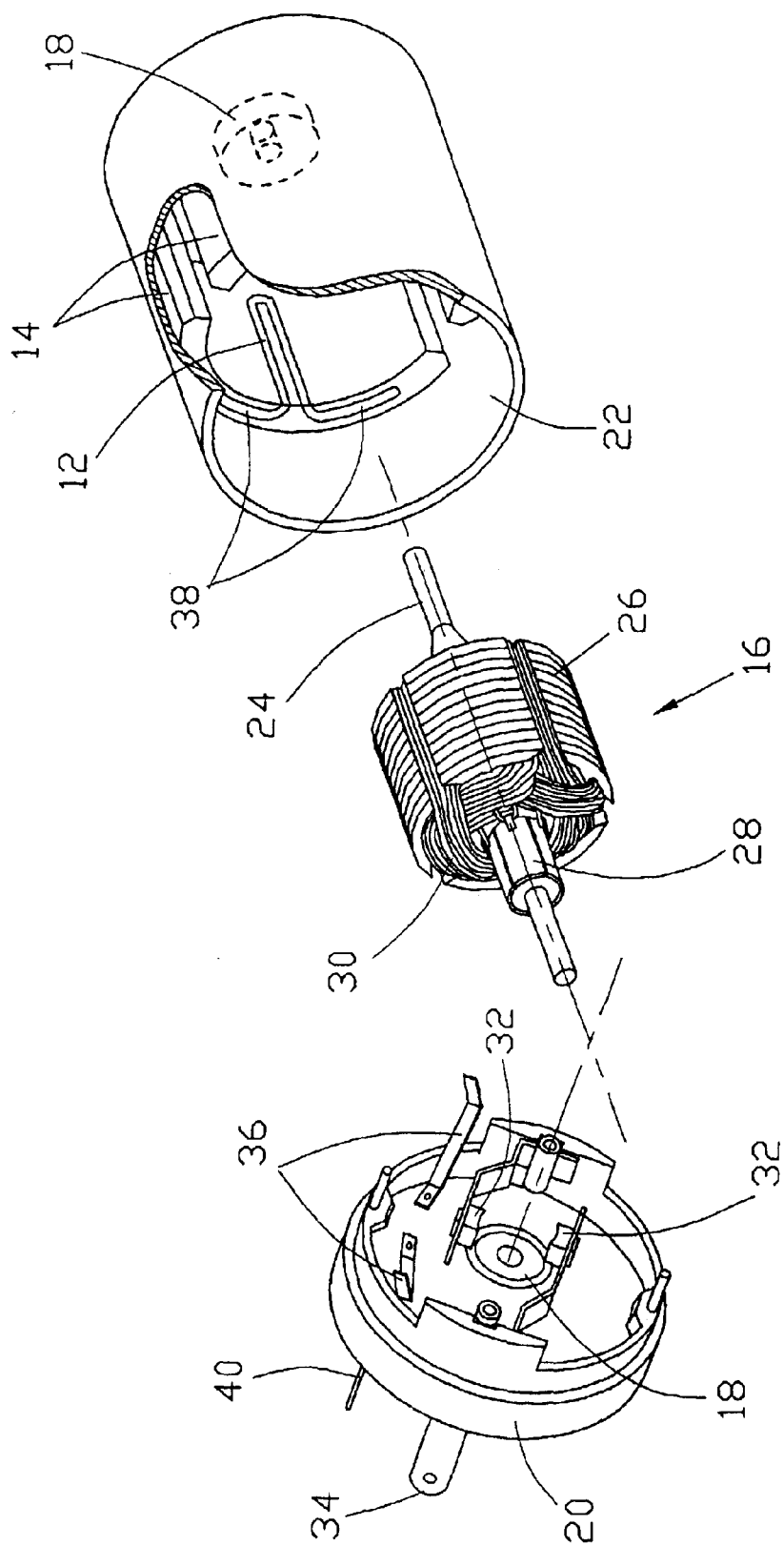
FIG. 1 is an exploded view of a pmdc motor in accordance with the preferred embodiment.

FIG. 1 illustrates a typical pmdc 10 motor modified to incorporate a speed sensor coil 12 according to a first embodiment of the present invention. The motor has a permanent magnet stator having two arcuate ceramic magnets 14. A rotor 16 is located in confronting relationship with the stator magnets 14 and is journaled in bearings 18 fitted to an end cap 20 and a rear housing part 22. The rotor has a shaft 24, armature core 26 and a commutator 28. The armature core 26 is a stack of laminations forming a plurality of salient poles about which coils are wound forming an armature winding 30. The coils are terminated on the commutator 28.

The end cap 20 supports brushes 32 which make sliding contact with the commutator 28 to electrically connect the armature winding 30 to a source of electric power via motor terminals 34. The end cap also supports two spring contacts 36. The spring contacts are resiliently deformable conductive strips which are connected to sensor terminals 40 on the end cap. Alternatively, the spring contacts could be conductive rubber posts fixed to and extending from the end cap.

One of the two magnets 14 has a conductive coil 12 formed on its radially inner surface which faces the armature core 26 across an air gap such that the coil 12 is in the air gap between the magnet 14 and the armature core. The coil 12 has a conductive U-shaped path forming a single turn. The thus shaped single turn coil starts and finishes at terminal pads 38 on an axial face of the magnet adjacent the end cap. The two spring contacts 36 are arranged to contact the terminal pads to transfer the signal from the coil 12 to external circuitry via the sensor terminals 40 on the end cap 20. The use of spring contacts greatly simplifies construction compared with soldering lead wires directly to the coil on the magnet.

Figure 2:
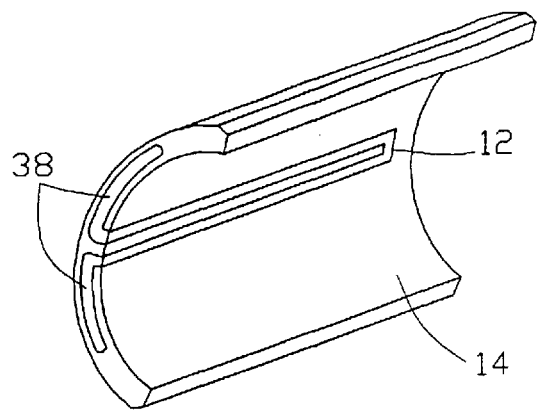
FIG. 2 shows a magnet of the motor of FIG. 1 supporting a speed sensor coil.

The coil 12 is shown more clearly in FIG. 2. The coil 12, being a single turn coil, is easy to apply without providing insulation between the turns. As such, the coil can be formed from conductive film, conductive foil, conductive tape or wire. In the embodiments described, the coil 12 is formed using a conductive ink such as silver epoxy, applied onto the surface of the magnet by a pad printing process. Alternatively, the ink could be applied by painting which is labor intensive or by screen printing but this is more difficult due to the surface of the magnet being curved. If the magnet surface is conductive, a non-conductive coating is needed to insulate the coil from the magnet surface. For ceramic magnets and resin-bonded magnets, this kind of coating is not needed.

From the above description, it can be seen that sensing the speed of a motor using a speed sensor according to the present invention does not require an increase in the size or bulk of the motor. With the coil 12 located between the magnet and the armature core 26, the magnetic flux passing through the coil varies as the rotor turns from a maximum when a pole is adjacent the coil to a minimum when a slot between the poles is adjacent the coil. The variation in the magnetic flux creates a voltage pulse in the coil and thus, as the rotor rotates, the sensor coil produces a series of pulse signals. By measuring the time between pulses or the frequency of the output signal, the speed of the motor can be determined. This information can then be used in a motor controller for controlling the speed of the motor.

A sharper, stronger signal can be produced using a coil having dimensions which are similar to the dimensions of the slot between the poles of the rotor core. If the "U" is too wide, the signal is not as sharp. If the "U" is too narrow, the amplitude of the signal is not as large making it harder to separate the signal from noise. It is preferred that the orientation of the "U" should correspond with the orientation of the slot. thus normally, the "U" would extend axially but for a motor with a skewed rotor core, the "U" should be similarly skewed.

Figure 3:
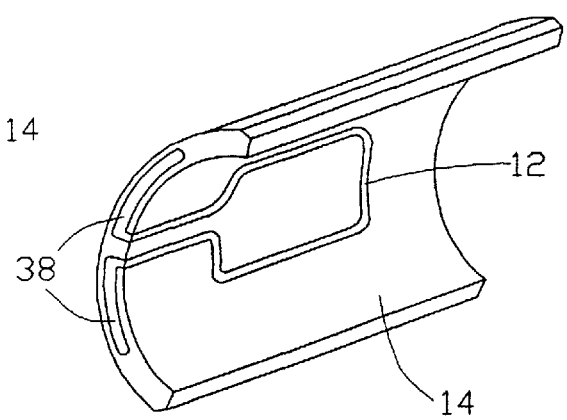
FIG. 3 shows a similar magnet supporting a speed sensor coil having a different shape.

FIG. 3 illustrates a coil embodiment using a wider coil 12. As mentioned above, this construction of the coil is not preferred but in low noise applications, it does produce satisfactory results and can be used with skewed and non-skewed armatures without modification.

The location of the coil across the face of the magnet is not critical for generating a good signal. However, the single turn coil also picks up a pulse due to commutation as the brushes slide from one commutator segment to the next. As the timing of the commutation spike is independent of the location of the coil, the location of the coil can be chosen so that the commutation spike and the signal pulse are separated in time or occur simultaneously as desired.

Figure 4:
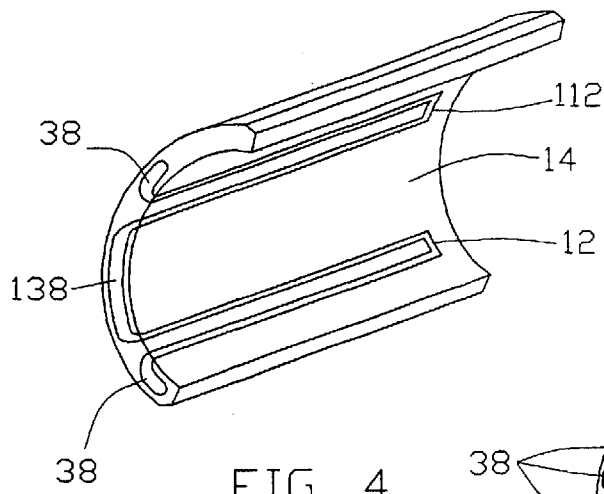
FIGS. 4 and 5 show a similar magnet supporting a speed sensor coil according to alternate embodiments.

For detecting low speed operation, such as a few hundred rpm, a coil with more than one turn may be required to get a reliable output signal. In a further embodiment shown in FIG. 4, two narrow U-shaped single turn coils 12, 112 are formed on the face of the magnet 14. The coils 12, 112 are connected in series and are circumferentially separated by a distance equal to the separation of the poles of the armature, the so-called slot to slot distance. For rotors with many poles, the separation could be a whole number multiple of the slot to slot distance. For example, for a three pole rotor the separation is 120 degrees and for a 5 pole rotor the separation is 72 degrees whereas for a 12 pole rotor the separation could be 30, 60, 90, 120 degrees etc taking in to account the arcuate extent of the magnet. In this arrangement whenever one armature pole slot passes over one of the coils 12, another armature pole slot is simultaneously passing over the other coil 112. Hence, the signal output is double that of a single coil arrangement. This design produces a two turn coil effect without using a two turn coil which would require a narrower conductive path and an insulating layer between two turns, at least at the point of crossover of the turns.

Figure 5:
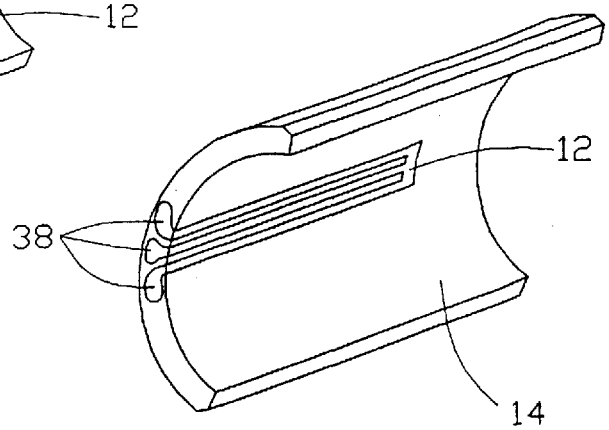

In an alternative design, shown in FIG. 5, two coils 12 are used. The coils are located side by side and share a common leg forming a W-shaped coil with three terminals 38. In the control circuitry or in the end cap, the two outer terminals are joined together so the coils function as two coils connected in parallel although slightly displaced circumferentially. Thus the signals of each coil are not superimposed but are spaced in time and reversed in direction producing a sinusoidal type pulse. This arrangement may be used to cancel or reduce the commutation pulse as the commutation pulse will occur simultaneously in each coil as it is independent of coil position but as one coil is reversed with respect to the other coil, the pulse should be inverted resulting in an overall reduction of the commutation spike in the speed sensor signal.

While preferred embodiments have been described in detail, various modifications will be apparent to the skilled addressee without departing from the spirit of the invention and it is intended that all such variations be covered by the invention as defined by the appended claims.

What is claimed is:

1. A permanent magnet direct current motor comprising:
   a permanent magnet stator including at least one permanent magnet;
   a rotor including a rotor shaft, an armature core mounted on the shaft and having a plurality of poles, an armature winding wound about the poles, and a commutator mounted on the shaft adjacent one end of the armature core and connected to lead wires of the armature winding, the rotor being journaled in bearings and located confronting the stator; and
   a speed sensor,
   wherein the speed sensor is an axially extending coil of conductive material fixed to the surface of the magnet and located in the air gap between the magnet and the armature core.

2. The motor of claim 1, wherein the conductive material is a thin deposit of conductive ink, especially a conductive epoxy.

3. The motor of claim 2, wherein the conductive ink is a silver epoxy.

4. The motor of claim 1, wherein the coil extends axially for substantially the axial length of the magnet.

5. The motor of claim 1, wherein the coil is a single turn coil.

6. The motor of claim 5, wherein the coil is a single turn coil in the form of a long narrow "U" extending substantially in the axial direction of the motor.

7. The motor of claim 6, wherein the coil extends axially at substantially the same angle as the poles of the armature core.

8. The motor of claim 6, wherein the coil has a lateral gap between the arms of the "U" substantially equal to the circumferential gap between the poles of the armature core.

9. The motor of claim 1, wherein the speed sensor further comprises a second single turn coil connected across the terminals of the first coil and located adjacent thereto but circumferentially spaced therefrom.

10. The motor of claim 9 wherein the two coils are connected in series and are separated circumferentially by a distance equivalent to a whole number multiple of the distance between the poles of the armature core.

11. The motor of claim 9, wherein the first and second coils are substantially U-shaped and have a common leg forming a long narrow W-shaped pattern.

12. The motor of claim 1, wherein coil terminals of the speed sensor are located on an axial end surface of the magnet.

13. The motor of claim 12, wherein the motor has a deep drawn cup like housing with an open end closed by an end cap and the coil terminals electrically engage with spring biased terminals fixed to the end cap.

14. The motor of claim 13, wherein the spring biased terminals are resiliently deformable fingers extending from the motor end cap.

* * * * *